United States Patent
Da silva et al.

(10) Patent No.: US 8,954,982 B2
(45) Date of Patent: *Feb. 10, 2015

(54) RESOURCE MANAGEMENT USING RELIABLE AND EFFICIENT DELIVERY OF APPLICATION PERFORMANCE INFORMATION IN A CLOUD COMPUTING SYSTEM

(75) Inventors: Dilma M. Da silva, White Plains, NY (US); Michael R. Hines, Ossining, NY (US); Kyung D. Ryu, New City, NY (US); Marcio A. Silva, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/619,215

(22) Filed: Sep. 14, 2012

(65) Prior Publication Data

US 2014/0047440 A1    Feb. 13, 2014

Related U.S. Application Data

(63) Continuation of application No. 13/572,104, filed on Aug. 10, 2012.

(51) Int. Cl.
*G06F 9/455* (2006.01)
*G06F 9/50* (2006.01)

(52) U.S. Cl.
CPC ............ *G06F 9/5077* (2013.01); *G06F 9/5027* (2013.01); *G06F 9/45558* (2013.01); *G06F 9/45533* (2013.01)

USPC ................................. 718/104; 718/1; 709/226

(58) Field of Classification Search
None
See application file for complete search history.

(56) References Cited

U.S. PATENT DOCUMENTS

| | | | |
|---|---|---|---|
| 8,078,728 B1 | 12/2011 | Pollan et al. | |
| 2010/0228819 A1 | 9/2010 | Wei | |
| 2011/0185063 A1 | 7/2011 | Head et al. | |
| 2011/0185064 A1 | 7/2011 | Head et al. | |
| 2012/0167081 A1* | 6/2012 | Sedayao et al. | 718/1 |

OTHER PUBLICATIONS

IBM, "Method of creating a componentized architecture for unifying resource sharing scenarios in Cloud Computing environment"; http://priorartdatabase.com/IPCOM/000193146; Feb. 11, 2010.

Anonymous, "Method and System for Allocating Resources to Physical Hosts in a Cloud Computing Environment", http://priorartdatabase.com/IPCOM/000208289; Jun. 24, 2011.

(Continued)

*Primary Examiner* — Qing Wu
(74) *Attorney, Agent, or Firm* — Scully, Scott, Murphy & Presser, P.C.; Daniel P. Morris, Esq.

(57) ABSTRACT

System and method and computer program product implemented for a cloud computing infrastructure that allows a hypervisor to optimize resource allocation in a cloud computing environment by exploiting the application-level performance, O/S system performance, and hypervisor performance information through a reliable and efficient channel.

22 Claims, 5 Drawing Sheets

(56) References Cited

OTHER PUBLICATIONS

Gupta et al., "Attaining System Performance Points: Revisiting the End-to-End Argument in System Design for Heterogeneous Many-core Systems", Operating Systems Review; vol. 45, No. 1, pp. 3-10; Jan. 2011.

Office Action dated May 16, 2014, received in a related U.S. Appl. No. 13/572,104.

* cited by examiner

RESOURCE MANAGEMENT USING RELIABLE AND EFFICIENT DELIVERY OF APPLICATION PERFORMANCE INFORMATION IN A CLOUD COMPUTING SYSTEM

CROSS-REFERENCE TO RELATED APPLICATION

This application is a continuation of U.S. patent application Ser. No. 13/572,104 filed Aug. 10, 2012 the entire content and disclosure of which is incorporated herein by reference.

FIELD

The present application generally relates to computer systems and more particularly to optimizing resource allocation in a Cloud Computing environment by exploiting application-level performance, (Operating System) O/S performance, and hypervisor performance information through a reliable and efficient channel.

BACKGROUND

Cloud computing provides storage, compute, and other information technology (IT) services on demand. Over the years, many organizations have either moved all, or part of, their applications and services to a cloud to provide, or employed cloud solutions to dynamically adjust, the IT infrastructure by integrating computing services according to surges and peak demands.

A cloud computing environment provides computation, software, data access, and storage services. Cloud computing describes a new supplement, consumption, and delivery model for Information Technology (IT) services based on Internet protocols, and it typically involves provisioning of dynamically scalable and often virtualized resources.

Cloud computing providers deliver applications via the internet, which are accessed from web browsers, desktop and mobile apps. All software, e.g., business software, applications and data are stored on servers at a remote location (e.g., a computing data center).

As known, "virtual" and "cloud computing" concepts includes the utilization of a set of shared computing resources (e.g., servers) which are typically consolidated in one or more data center locations. For example, cloud computing systems may be implemented as a web service that enables a user to launch and manage computing resources (e.g., virtual server instances) in third party data centers.

Different computing resources may be created within a cloud computing infrastructure or data center. For example, a resource may include all the components necessary to run application software, and may include, e.g., UNIX, Linux, or Windows operating systems (O/S), middleware, and specific application software or data, as desired by a user.

Typically, dynamic provisioning of resources is employed to replicate capabilities and/or services in a distributed computing infrastructure such as in a cloud environment, to overcome potential disruptions in the capabilities and/or services. These resource allocations decisions are based on obtained systems-level performance information.

Current solutions to optimize resource allocation typically require establishing and setting a user-level private channel between application and a resource management module with network connections. With this existing approach, timely delivery of information is not guaranteed when computing resources are tight or network policy prevents creation of required ports. In addition, resource optimization is limited due to lack of correlated information in any guest operating system (O/S), application software, and/or hypervisor.

It would be highly desirable to provide for Cloud Computing Systems and their respective virtual machine hypervisors the ability to make resource management decisions using systems-level performance information in addition to application performance attributes.

BRIEF SUMMARY

There is provided, in one aspect, a system, method and computer program product implemented for a cloud computing infrastructure that allows a hypervisor to optimize resource allocation in a cloud computing environment by exploiting the application-level performance, O/S system performance, and hypervisor performance information through a reliable and efficient channel.

In one aspect, the present disclosure is directed to a system and method that first exposes application performance attributes (e.g., Throughput and Latency) directly to a software management stack of a Cloud Computing System. Once exposed, the Cloud Computing System manages hypervisor resources like CPU, Memory, I/O and Network resources by growing or shrinking those resources in a manner that exceeds the amount of variation achievable by only using systems-level performance information (such as scheduling behavior, page-fault behavior, I/O and Network traffic patterns).

In a further embodiment, the performance-related information can be collected at multiple layers: application, guest operating system, and hypervisor levels. They can be merged into one message to be delivered to the target decision entity. This collection of information across the layers then can be used with or without correlation to make decisions for resource management, policy enforcement, and other system services.

Thus, in a further aspect, there is provided a system, method and computer program product for reliable data delivery in a cloud computing environment running multiple virtual machines, a virtual machine having one or more applications running. The method comprises: generating, by a kernel level process, a system call providing operating system level performance data regarding performance metrics of the running virtual machine; receiving, at a host machine hypervisor level process, the performance data via the system hypercall; generating, by the running application process, a further system call providing application performance metrics data regarding performance metrics of one or more the running applications; receiving, at a kernel level process of a virtual machine, the application performance metric data of the further system call, the kernel level process responsively generating a further hypercall relaying the application performance metric data to the host machine hypervisor; and, the host machine hypervisor delivering the application performance metric data and the system level performance data regarding the running virtual machine to a cloud controller for managing resources of the cloud computing environment.

DRAWINGS

The objects, features and advantages of the present invention will become apparent to one ordinary skill in the art, in view of the following detailed description taken in combination with the attached drawings, in which.

Figure 4:
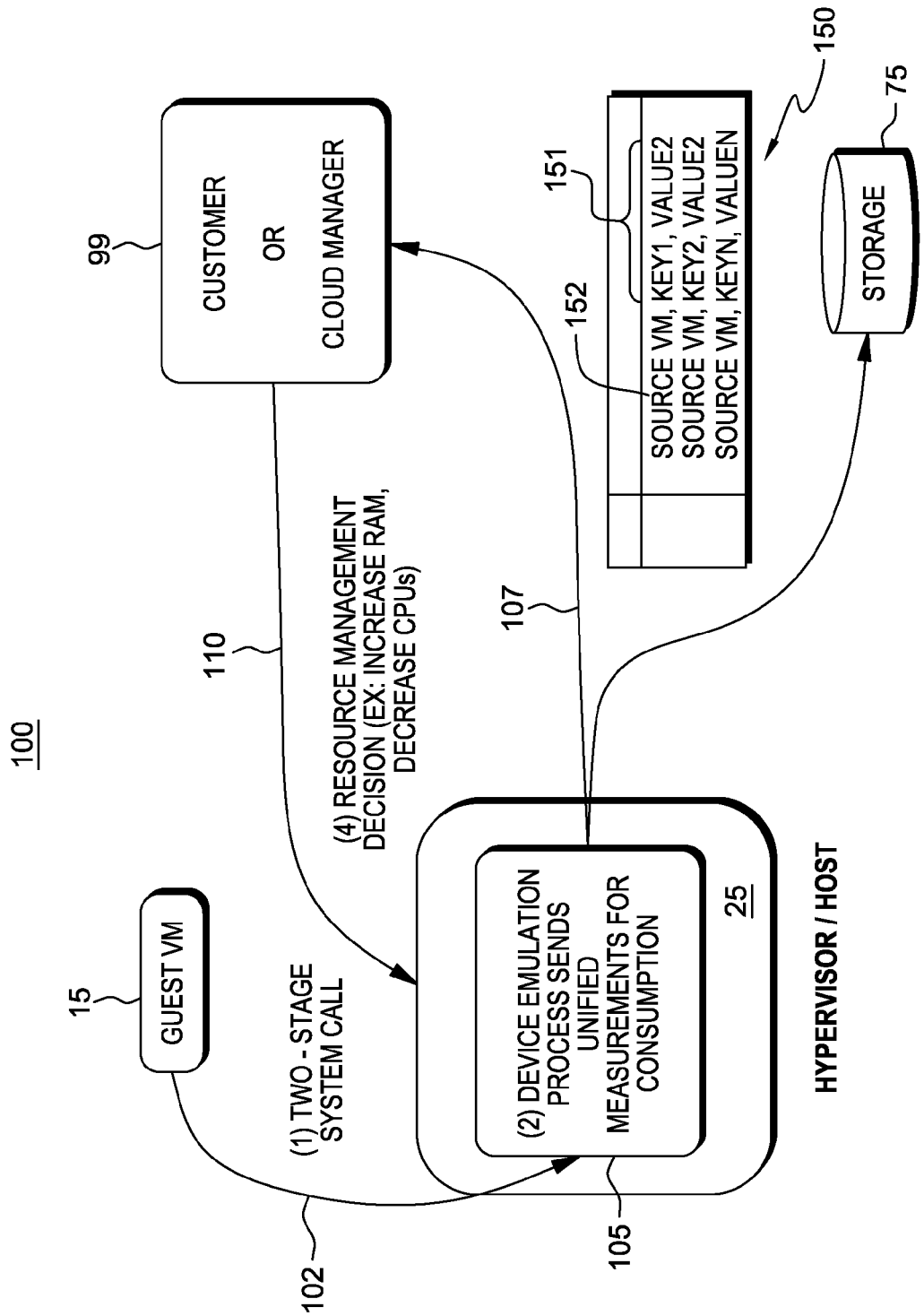
Figure 5:
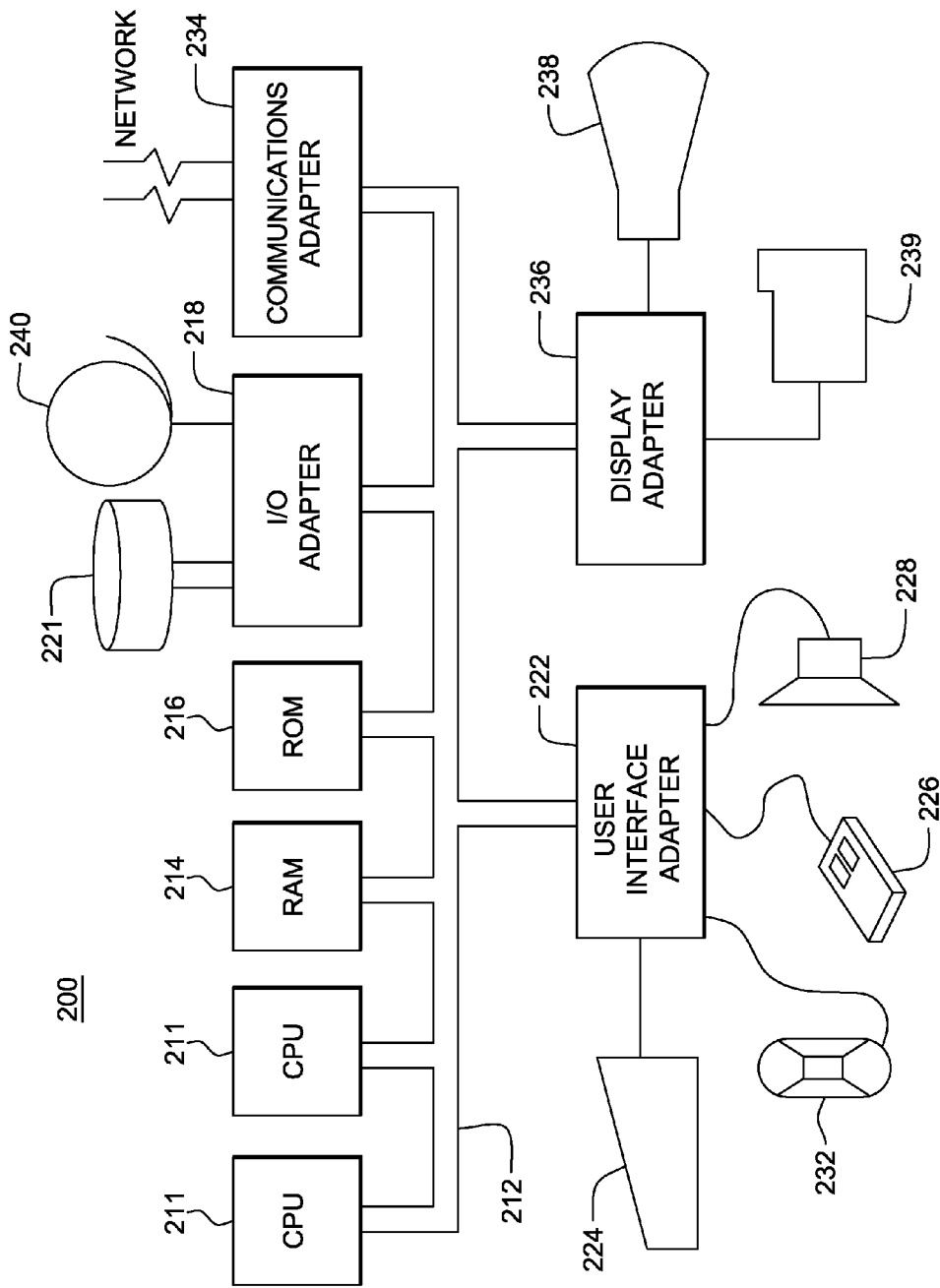

FIG. 4 depicts an overall methodology 100 comprising a control loop for facilitating decision entity resource management decisions based on received performance related metric and status data for nodes amongst the application, VM and hypervisor layers; and, FIG. 5 illustrates an exemplary hardware configuration of a computing system 200 running and/or implementing the methods of the described embodiments.

DETAILED DESCRIPTION

Figure 1:
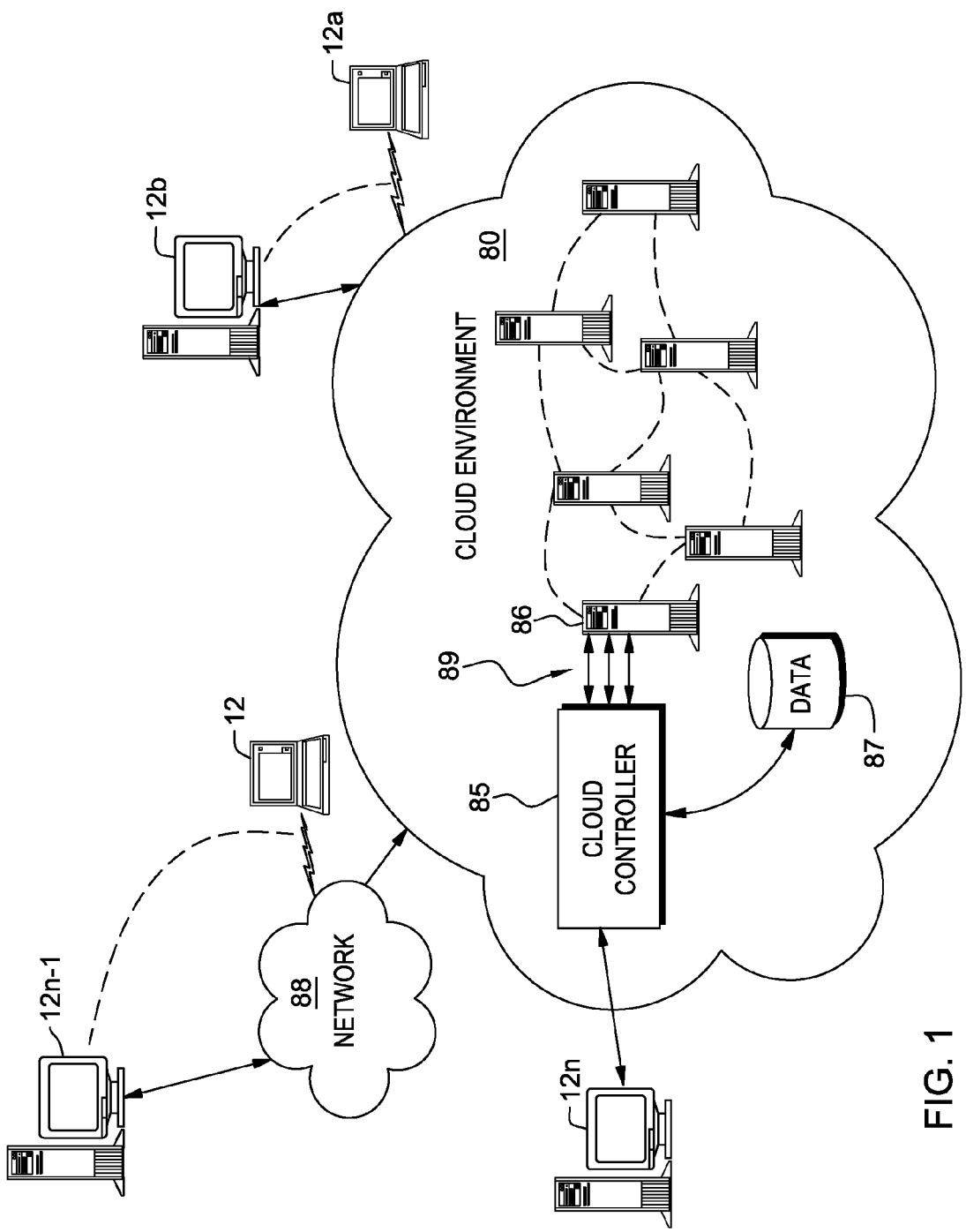
FIG. 1 illustrates an example cloud environment 80 in which the present system and method is deployed, in one embodiment.

FIG. 1 depicts an example data center or cloud computing environment 80 in which the present system and method is deployed.

Typically, a cloud 80 comprises a cloud manager or cloud controller 85 (e.g., a computer such as a server), a group of servers 86, and one or more memory storage device(s) 87 hosting application data, support data and other data. Although not shown, the cloud 80 may comprise additional servers and/or additional storage devices. The cloud manager or controller 85 typically receives a job(s) from client(s) 12a, 12b, . . . , 12n. For example, as shown in FIG. 1, example clients (computing/mobile devices) 12a, 12b submit processing tasks or jobs directly to the cloud service or cloud controller 85, while example client devices 12, . . . , $12_{n-1}$ submit processing tasks or jobs via a network environment 88, e.g., Internet or Intranet through a web services interface of the cloud 80.

In a cloud computing environment 80 such as depicted in FIG. 1, methods and systems are provided to allocate resources to physical hosts through a distributed system. Example management/cloud controller software that runs within such an environment include the Amazon EC2 compute Cloud, OpenStack, Citrix CloudStack, OpenNebula, and others. Typically these cloud controllers or cloud managers 85 send signals 89 for configuring and allocating resources amongst the physical hosts, e.g., servers 86 in the cloud computing environment 80.

Figure 2:
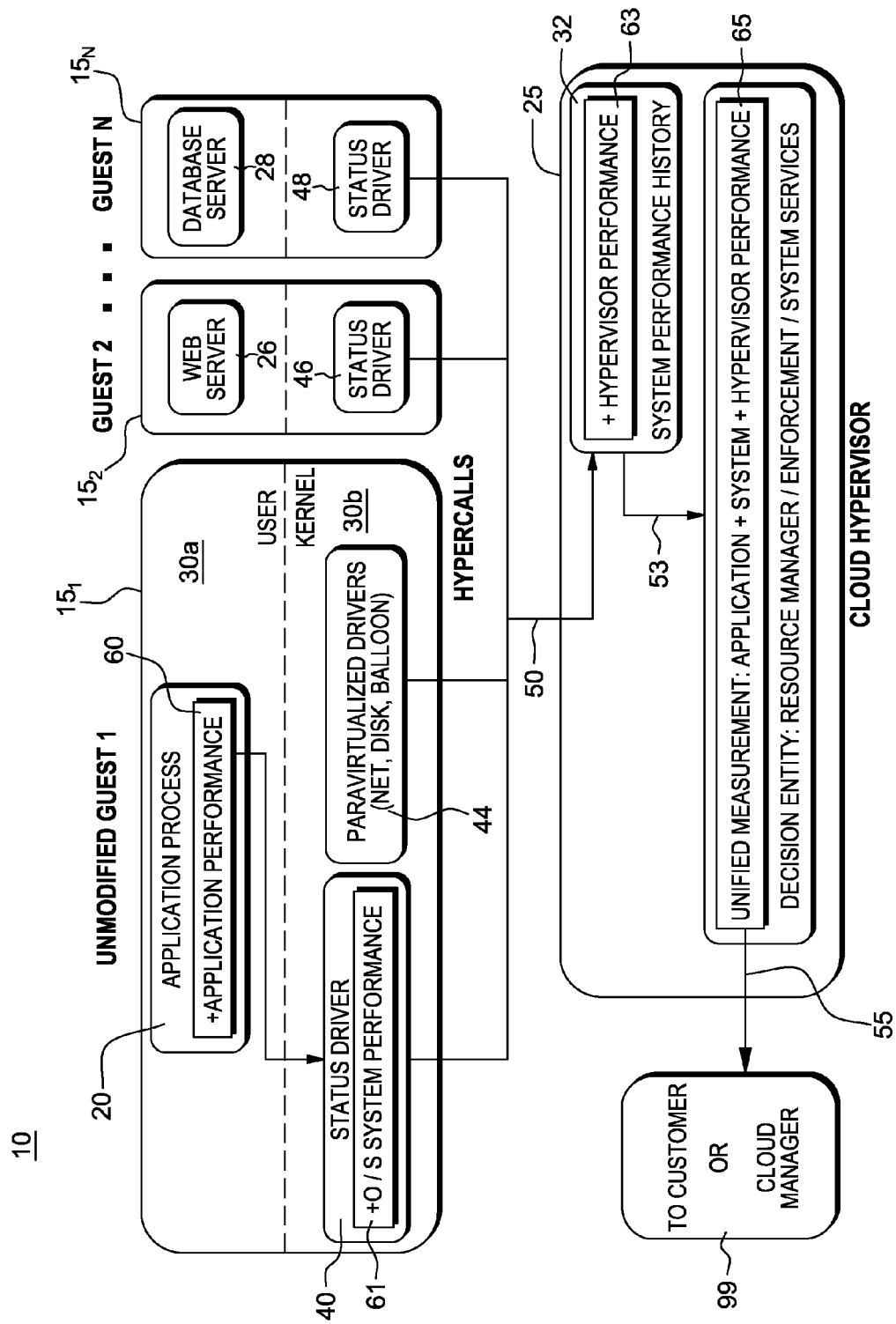
FIG. 2 shows a system diagram of a system architecture 10 in which the present system and method described is implemented in the cloud environment.

FIG. 2 shows a system diagram of a system architecture 10 in which the present system and method described is implemented in the cloud environment. As shown in FIG. 1, there is provided plurality of guest systems e.g., virtual machines (VM) $15_1$, . . . , $15_N$ operating in a cloud environment, running on top of a physical machine "hypervisor" 25. The guest systems may each operate under a same or different operating systems (O/S) applications, e.g., such as Linux and Window® (a Registered Trademark of Microsoft Corporation) O/S processes. In one embodiment, shown in FIG. 2, each guest VM runs one or more application processes, e.g., software, middleware components (e.g., Application Server, Web Server or Database Server). For example, guest VM $15_1$ is shown running an application, e.g., a Windows®-based operating system, while on guest VM $15_2$ is run an example web-server application process, and on guest VM $15_N$, is run a database server application process, for example. Each of these applications utilize resources (e.g., memory, Central Processor Unit(s), I/O) of a host device such as a computer system which may be one of many computer systems or server devices 86 forming the cloud environment 80.

As in conventional architectures, each guest VM is shown to run processes at application or user level 30a and the system or kernel level 30b. Kernel level 30b processes for each guest VM include device driver components, such as a status driver 40 and other driver components 44 (e.g., device drivers such as network, disk) may be run on guest VM $15_1$. A status driver component 46 runs in guest VM $15_2$, and a status driver component 48 runs in guest VM $15_N$.

In one embodiment, each VM sends application performance metrics to hypervisor 25 through a two-level call 50. For example, as shown in FIG. 2, an application 20 running on guest VM $15_1$ provides application performance metrics 60. In FIG. 2, a '+' sign indicates the collection of additional performance measurements information at the respective node (in each respective VM). For example, application performance metrics 60 may include, but are not limited to: throughput, and latency metrics, response time, configuration changes, or any other performance-oriented, variable data that the application may deem important for external consumption by a cloud manager/controller or customer. These metrics 60 are continuously generated as part of application processing, and this data is made available to the hypervisor via a system hyper-call 50 to the hypervisor. In a further process, shown in FIG. 2, the VM status driver 40 provides monitoring of operating system (O/S) performance (e.g., guest or O/S system performance) via system hyper-call 50 to the hypervisor. Examples of such O/S performance data 61 may include, but is not limited to: scheduling behavior, page-fault behavior, I/O and Network traffic patterns, etc.

The hypervisor 25 receives the (O/S) performance 61 and application performance metrics data 60 from the system calls 50 and may be stored and/or bundled with additional information such as hypervisor performance metrics data 63 at the cloud hypervisor 25. That is, the hypervisor 25 is configured to collect, within it's own OS kernel, the same performance metrics that a guest OS kernel may collect. In one embodiment, the collected performance metrics data may be further stored (e.g., for recordation purposes) as records providing a "System Performance History" 32 from which the Hypervisor 25 may use to make local resource management decisions before that data is delivered, e.g., pushed out, to a cloud manager or customer. The collected data records may further be bundled 53 as a unified measurement 65, i.e., including grouped or bundled (O/S) system performance 61, application performance metrics data 60, and hypervisor performance metrics data 63 corresponding to a VM in the cloud, to a $3^{rd}$ party decision entity 99: e.g., an external Cloud Management Service managing the cloud (e.g., Cloud controller 85) or Customer 12 utilizing cloud resources. This unified measurement may be communicated over a network connection 55, whether to a local or the external cloud management service or customer entity 99 may responsively make a global resource management decision (such as a stop VMs, start VMs, migrate VMs, etc).

Figure 3:
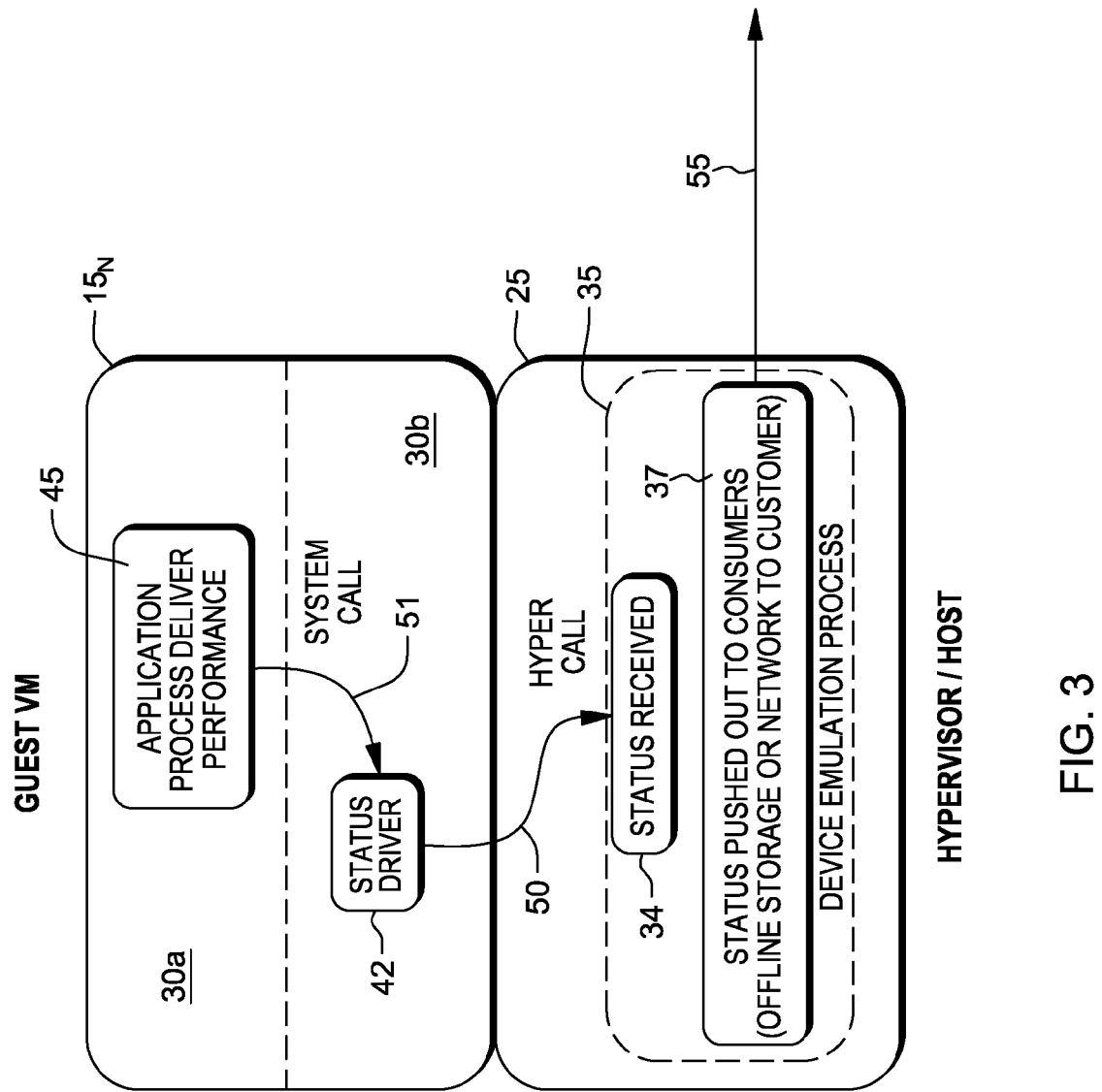
FIG. 3 depicts the two-way call 50 in which an application process communicates application performance status information that is relayed to an underlying host system's hypervisor device emulation process in one embodiment.

Information delivery flow steps and parameters are now described with respect to FIG. 3 which depicts the two-way call 50 in which the application process 45 communicates application performance status information to Guest VM Operating System Kernel 30b, and which VM Operating System Kernel status driver process 42 relays the guest O/S performance and status data 61 and application performance metric 60 information to the underlying Host Hypervisor's device emulation process 35.

For example, in FIG. 3, there is shown Application Process 45, for example, an O//S process, a Java® process, a web server, or database server, running in user layer 30a of Guest VM 15$_N$. The application, via an (Guest) Operating System Kernel call 51, communicates application performance metric or status information 60 to a kernel level process 42 that receives the performance information/status and relays it to the hypervisor of that host system. This system call 51 to the status driver 42 is completely synchronous (unless the calling process or calling VM is pre-empted/unscheduled by the callee operation system). Then, via a hypercall 50, application performance metrics information 60 is communicated to the hypervisor 25. One example and non-limiting format of application process system call 51 carrying application performance information to the kernel layer process is: call(Resource_name or status, value). Example system calls 51 to the kernel layer include status information such as: call(Throughput, too low) or call(Latency, TOO_HIGH) referring to application process metrics 60 of the application run in the guest VM. In one embodiment, the calling application process or thread 45 must be schedulable (e.g., the guest kernel 30b can put process on O/S runqueue (not shown)) even though other resources are overwhelmed.

The application process 60 and O/S system performance/status data 61 are communicated to hypervisor process 35 via a system call into the Hypervisor process ("hypercall" 50). In one embodiment, the hypervisor process 35 may include a Device Emulation process (a standard virtualization component which is responsible for routing I/O requests in a hypervsor to the actual device that the I/O is destined for). One example and non-limiting format of the hypercall 50 is: call (Resource_name or status, value). Example hypercalls to the hypervisor process include: call(Source VM identifier, resource name or status, value) and any new, additional calls needed for Operating System level performance information. Examples include: call(VM15, CPU_Load, 100%), call (VM15, memory_usage, TOO_HIGH), call(VM15, Demand, LOW), informing of guest system performance status, e.g., CPU load status, memory usage load status, etc. In one embodiment, a Hypervisor 25 status receive process 34 receives the status information synchronously from any one of the VMs 15. The hypervisor 25 must reserve sufficient resources for itself to receive a high-priority hypercall, potentially stalling other lower-priority guest I/O (disk/network) that may be overwhelmed. As it is required that performance measurements be guaranteed delivery, the hypervisor 25 may have to reserve resources for itself or run the risk that the hypervisor itself may become overwhelmed/unavailable.

As policies for managing system resources (such as scheduling policy, memory swapping policy, or I/O multiplexing policy) may be enforced by the hypervisor, priority may be governed according to a policy decision as implemented by hypervisor. Thus, in one aspect, a) Performance measurement delivery hypercalls or system calls 51 are given highest priority; b) I/O hypercalls, which deliver normal virtual machine data or running services are lower in priority. Thus, if two hypercalls are issued at the same time, the hypervisor will always deliver the performance measurement before the I/O is delivered.

Thus, the system and methods ensure that the performance information interested in being delivered, be successfully delivered to an external 3$^{rd}$ party decision entity 99 (e.g., the customer or cloud manager).

Referring to FIG. 3, in one embodiment, a Hypervisor 25 process 37 assembles and pushes the bundled application performance metrics data, system status information and hypervisor performance data to the Customer or Cloud manager 99 offline, or via any network connection service or shared storage location 55 for consumption. The bundling process merges the application performance metrics data, system status information and hypervisor performance data into one message to be delivered to the target decision entity. One example and non-limiting format of the Unified Measurement data 65 being delivered (e.g., pushed) is: send ((Source hypervisor, Source VM, resource name or status, value)+any new, additional Hypervisor-level system performance information). In one embodiment, the delivered information 65 can be consumed asynchronously by a Cloud Management Stack (not shown) of the cloud controller 85.

FIG. 4 depicts an overall methodology 100 including 102 the generation of application performance data 60 from application process running in an identified guest VM via system call and/or O/S system performance or status data 61 which is communicated to the hypervisor 25 via a two-stage call. Then, at 105 there is depicted the bundling of the application performance data 60 and system performance or status data 61 via a hypervisor process along with the hypervisor performance information to obtain Unified Measurement data 65. At 107, the Unified Measurement data 65 is pushed to the decision entity 99 either off-line through storage or by network connection. Optionally, or in addition, the data 65 may be stored in a storage device 75 or transmitted to a customer. For example the Unified Measurements data 65 may be stored in a database, e.g., as a database table 150 organized, for example as key value pairs 151 associated with a VM identifier 152, for each active VM of the system. As the "unified" transmission 55 that reports the grouping together all measurements that belong to the same originating component (i.e. the Application process 20, the VM 15, or the Hypervisor 25), the key value pairs 151 of table 150 may be associated with an application process, guest VM or hypervisor.

The system thus maintains ability to always identify which component of the system a particular measurement comes from (from which guest VM). As information travels down the system from top to bottom there is collected additional performance measurements as indicated in FIG. 1 system diagram. Each time a measurement is taken, it is labeled, ultimately, with the virtual machine or hypervisor to which originated the transmission of the information in the first place. During each step of the two-way call, the measurement accumulates a 'label' of the component that originated the measurement (i.e. the App, the VM, or the Hypervisor).

It is understood that the system calls to deliver this measurement information is without the use of memory allocation. This is because of a requirement that the caller process of either system call be schedulable (able to be placed on the OS runqueue of the callee), then all that is required for guaranteed delivery is that the intended key/value be sent as parameter arguments of the system call itself. That is, each time a piece of performance information is delivered, it is passed through two, synchronous, system calls—one between the application and the guest VM kernel, and a second between the guest VM kernel and the hypervisor. Because the information is a key and a value, it is configured to fit inside the arguments of the system call with no need for megabytes of memory to deliver this information to the hypervisor which would otherwise require memory allocation. Thus, the guarantee is enforced so long as the guest VM kernel can still "schedule" the process that is intending to send the performance information.

At 110, FIG. 4, from the received (pushed) Unified Measurements data 65, actions may be taken by the customer or cloud manager entity 99 receiving the measurements. In one embodiment, the system 10 is implemented in the form of a control loop where 3$^{rd}$ party decision entity, i.e., customer or cloud manager 99, receives the reliably delivered information 65 and attempts to make a resource management decision at 110, e.g., by decreasing CPUs or increasing the amount of RAM memory.

In one embodiment, the collection of information across the Application, VM and hypervisor layers is then used with or without correlation to make decisions for resource management, policy enforcement, and other system services. For example, if the cloud manager or cloud controller detects that a guest VM kernel is swapping memory pages to disk due to a lack of RAM, and also detects that the application process has a very high demand of requests for a new product that is being sold, then the manager might make a deduction that the reason for the lack of RAM is that the application requires additional memory to process the higher number of requests. Thus, the cloud manager could instruct the hypervisor of the corresponding guest VM to increase the amount of RAM available for use by the guest VM.

In one embodiment, at 110 Customer or Cloud Manager entity 99 will communicate with the Underlying Hosting Hypervisor 25, e.g., Offline via any network service or shared storage location or device. One example and non-limiting message format is: change(resource, component, delta change in value). Thus, for example, responsive to the unified transmission 55, an example communication from the cloud manager to the hypervisor or host includes: add RAM to virtual machine or remove processors from a virtual machine. This delivered information may be consumed asynchronously by the hypervisor 25.

Thus, advantageously, delivery of application information in a resource-constrained virtual machine is guaranteed even when there are not enough resources for the application itself to make forward progress. This is done by using system calls to deliver this information without the use of memory allocation. This application information (delivered reliably) for the purpose of cloud-scale resource management may be used for a variety of reasons, including but not limited to: resource over-commitment (e.g., over-provisioning of storage, memory, network or CPU resources where the hypervisor is allocated a certain amount of resources which are not being fully utilized by the hosted virtual machines), or other application-level decisions a cloud might be interested in during the time VMs are provisioned: such as using performance information to guide migration techniques to prevent conflicting VMs from being on the same hypervisor, or similarly to ensure that VMs participating in the same application are hosted on the same hypervisor. In each of these cases, fine-grained, reliable delivery of runtime performance information is critical—even in the face of a high swapping activity, high network load, or high CPU activity.

Thus, a cloud's resource management decisions can make forward progress, even in the face of uncertain performance conditions of the applications running on top of them which might otherwise interfere with the reliable delivery of that information.

FIG. 5 illustrates an exemplary hardware configuration of a computing system 200 running and/or implementing the method steps for the Unified Measurements data push implementation. The hardware configuration preferably has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting the system 200 to a data processing network, the Internet, an Intranet, a local area network (LAN), etc., and a display adapter 236 for connecting the bus 212 to a display device 238 and/or printer 239 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A system for reliable data delivery in a cloud computing environment comprising one or multiple virtual machines (VM), each virtual machine running one or more applications, said system comprising:
a first hardware processor running a VM kernel level process and generating a system call to provide operating system level performance data regarding performance of a running VM;
a second hardware processor running a host machine hypervisor level process for receiving said VM performance data via said system call;
said first hardware processor running an application at said running virtual machine and generating a further system call to provide application performance metrics data of said running application to said running VM kernel level process,
said running VM kernel level process responsively generating a hypercall relaying said application performance metrics data to a host machine hypervisor; and,
said host machine hypervisor delivering said application performance metrics data and said system level performance data regarding said running virtual machine to a cloud controller to manage resources of said cloud computing environment.

2. The system of claim 1, wherein said cloud controller for managing resources is a software management stack of a cloud computing environment.

3. The system of claim 1, wherein said further system call provides application performance status information.

4. The system of claim 3, wherein said host machine hypervisor generates hypervisor performance data, said host machine hypervisor pushing said application performance metrics and application performance status information, said system level performance data and hypervisor performance data to said cloud controller.

5. The system of claim 4, wherein said first hardware processor is configured to merge application performance metrics data and status information, system level performance data and hypervisor performance data into a single message to be delivered to the cloud controller.

6. The system of claim 4, wherein said host machine hypervisor correlates the application performance and status information, system level performance data and hypervisor performance data to manage allocation of resources or for policy enforcement.

7. The system of claim 1, wherein said cloud controller for managing resources manages hypervisor resources comprising: CPU processing allocation, memory allocation, I/O and network resources allocation by adding or reducing those resources.

8. The system of claim 1, wherein said host machine hypervisor guarantees delivery of said application performance metrics data and system level performance data to said cloud controller for managing resources.

9. The system of claim 1, wherein said cloud controller includes a cloud customer utilizing cloud resources.

10. The system of claim 1, wherein said system call and further system call providing each said application performance metrics data, status information and/or system level performance data includes a key-value pair identifying an originating VM device or application and an associated measurement or status value, said key-value pair configured to fit inside arguments of the system call or further system call.

11. The system of claim 10, wherein said system call and further system call providing said key value pair are configured to be delivered to said host machine hypervisor without the use of memory allocation at said hypervisor.

12. A computer program product for reliable data delivery in a cloud computing environment comprising one or multiple virtual machines (VM), each virtual machine running one or more applications, the computer program product comprising:
a non-transitory storage medium readable by a processing circuit and storing instructions for execution by the processing circuit for performing a method comprising:
generating, by a kernel level process, a system call providing operating system level performance data regarding performance metrics of a running virtual machine;
receiving, at a host machine hypervisor level process, said performance data via said system call;
generating, by a running application process, a further system call providing application performance metrics data regarding performance metrics of one or more said running applications;
receiving, at said kernel level process of said running virtual machine, said application performance metrics data of said further system call,
said kernel level process responsively generating a hypercall relaying said application performance metrics data to a host machine hypervisor; and,
said host machine hypervisor delivering said application performance metrics data and said system level performance data regarding said running virtual machine to a cloud controller for managing resources of said cloud computing environment.

13. The computer program product of claim 12, wherein said cloud controller for managing resources is a software management stack of a cloud computing environment.

14. The computer program product of claim 12, wherein said further system call provides application performance status information.

15. The computer program product of claim 14, further comprising:
generating, at said host machine hypervisor, hypervisor performance data, said host machine hypervisor pushing said application performance metrics and performance status information, said system level performance data and hypervisor performance data to said cloud controller.

16. The computer program product of claim 15, wherein said method further comprising:
merging said application performance and status information, system level performance data and hypervisor performance data into a single message to be delivered to the cloud controller.

17. The computer program product of claim 15, further comprising:
    correlating the application performance and status information, system level performance data and hypervisor performance data to manage allocation of resources or for policy enforcement.

18. The computer program product of claim 12, wherein said cloud controller for managing resources manages hypervisor resources comprising: CPU processing allocation, memory allocation, I/O and network resources allocation by adding or reducing those resources.

19. The computer program product of claim 12, wherein said host machine hypervisor guarantees delivery of said application performance metrics data and system level performance data to said cloud controller for managing resources.

20. The computer program product of claim 12, wherein said cloud controller includes a cloud customer utilizing cloud resources.

21. The computer program product of claim 12, wherein said system call and further system call providing each said application performance metric data, status information and/or system level performance data includes a key-value pair identifying an originating VM device or application and an associated measurement or status value, said key-value pair configured to fit inside arguments of the system call or further system call.

22. The computer program product of claim 21, wherein said system call and further system call providing said key value pair are configured to be delivered to said host machine hypervisor without the use of memory allocation at said hypervisor.

* * * * *